US012546072B2

(12) United States Patent
Maguire et al.

(10) Patent No.: US 12,546,072 B2
(45) Date of Patent: Feb. 10, 2026

(54) GRAVITY CLEAN-OFF MAGNETIC SWEEPER APPARATUS

(71) Applicant: Bluestreak Equipment Inc., Delhi (CA)

(72) Inventors: John Maguire, Woodstock (CA); Brian Weber, Delhi (CA)

(73) Assignee: BLUESTREAK EQUIPMENT INC.

( * ) Notice: Subject to any disclaimer, the term of this patent is extended or adjusted under 35 U.S.C. 154(b) by 63 days.

(21) Appl. No.: 18/510,306

(22) Filed: Nov. 15, 2023

(65) Prior Publication Data

US 2024/0159004 A1 May 16, 2024

Related U.S. Application Data

(60) Provisional application No. 63/425,665, filed on Nov. 15, 2022.

(51) Int. Cl.

| | |
|---|---|
| ***E01H 1/14*** | (2006.01) |
| ***B03C 1/08*** | (2006.01) |
| ***E02F 3/96*** | (2006.01) |
| ***H01F 7/02*** | (2006.01) |

(52) U.S. Cl.

CPC ................. *E01H 1/14* (2013.01); *B03C 1/08* (2013.01); *H01F 7/02* (2013.01); *B03C 2201/20* (2013.01); *B03C 2201/30* (2013.01); *E02F 3/96* (2013.01)

(58) Field of Classification Search

CPC .. E01H 1/14; E02F 3/96; E02F 3/3414; B03C 1/08; B03C 1/30; B03C 2201/30
USPC .................................................. 209/215, 228
See application file for complete search history.

(56) References Cited

U.S. PATENT DOCUMENTS

| | | | | |
|---|---|---|---|---|
| 4,840,105 A * | 6/1989 | Ladan | ....................... B63G 7/06 | 89/1.13 |
| 5,291,819 A * | 3/1994 | Hambric | ................. F41H 11/28 | 37/405 |
| 2009/0223683 A1* | 9/2009 | Davidson | .................. E02F 7/04 | 171/45 |

FOREIGN PATENT DOCUMENTS

| | | | |
|---|---|---|---|
| JP | H0939457 A * | 2/1997 | ................ B42F 7/00 |

OTHER PUBLICATIONS

Takashi; Matsuoka, "Document Housing Cylinder for Machine Apparatus" (English Translation), Feb. 10, 1997, worldwide.espacenet.com (Year: 1997).*

* cited by examiner

*Primary Examiner* — Molly K Devine

(57) ABSTRACT

A gravity clean-off magnetic sweeper apparatus that connects to the front of industrial equipment or industrial vehicles where a bucket would normally go. The magnetic sweeper is lifted off the ground slightly and driven around an area to pick up metal debris. The collected debris is then cleaned off of the bottom of the invention by lifting it with the machine and pivoting it downward. As the magnetic sweeper is pivoted downward, the mass of the magnets, which is greater than its attraction force to the metal debris attached to the pan in between the magnet and the debris, allows the magnet to hang vertically, as the pan is forced away from the magnet. This removes the metal debris away from the magnetic field and allows it to fall from the magnetic sweeper.

10 Claims, 17 Drawing Sheets

| Distance A | 3" | 4" | 5" | 6" | 7" |
|---|---|---|---|---|---|
| Gauss (G) | 532 | 428 | 380 | 316 | 270 |

GRAVITY CLEAN-OFF MAGNETIC SWEEPER APPARATUS

CROSS REFERENCE TO RELATED APPLICATIONS

This application claims priority to and the benefit of U.S. Provisional Application Ser. No. 63/425,665, entitled "GRAVITY CLEAN-OFF MAGNETIC SWEEPER APPARATUS", filed on Nov. 15, 2022, the disclosure of which is incorporated herein by reference in its entirety.

BACKGROUND

The field of the disclosure relates to sweeper apparatuses, in particular to a magnetic sweeper apparatus.

A magnetic sweeper apparatus is typically configured as an attachment to industrial vehicles or industrial equipment to assist in using magnetism to pick up ferrous or metallic objects.

In some instances, some industrial equipment does not have hydraulics available to run attachments with. For example, only a small percentage of backhoe loaders and wheel loaders have hydraulics readily available at the front bucket location, where a magnet is preferred to be attached.

The removal of the need for hydraulics or other power function to clean off the magnet, lowers cost and increases the number of pieces of equipment (e.g., Prime Movers) the disclosure can be used on.

It correspondingly makes the product much simpler which greatly reduces the number of parts required to manufacture the product as well as increases the product's reliability and reduces maintenance for the end user.

The attachment can be used without the operator having to exit the vehicle or get assistance to attach hydraulics or assist cleaning off the magnet. This allows one person operation in a very safe and controlled manner from inside the Prime Mover cab.

There is a desire to enable a magnetic sweeper apparatus to attach to industrial equipment without hydraulics support.

SUMMARY

A gravity clean-off magnetic sweeper apparatus that connects to the front of industrial equipment or industrial vehicles where a bucket would normally go. The magnetic sweeper is lifted off the ground slightly and driven around an area to pick up metal debris. The collected debris is then cleaned off of the bottom of the invention by lifting it with the machine and pivoting it downward. As the magnetic sweeper is pivoted downward, the mass of the magnets, which is greater than its attraction force to the metal debris attached to the pan in between the magnet and the debris, allows the magnet to hang vertically, as the pan is forced away from the magnet. This removes the metal debris away from the magnetic field and allows it to fall from the magnetic sweeper.

DETAILED DESCRIPTION

This disclosure solves the problem by using the already designed dumping mechanisms of the machine that the magnetic sweeper is attached to. Loaders, backhoes and skid steers, etc. (Prime Movers), are primarily designed to use a bucket to pick-up and dump materials. This disclosure uses this existing dumping action to pivot the bottom pan of the invention away from the magnet contained within (attached to a pivot point), to clean the metal debris off the bottom and back side of the invention.

The magnet can be split into individually pivoting magnets which can decrease the swinging mass on larger magnet assemblies or to make use of an alternating polarity magnet for applications requiring different sweeping heights.

Figure 1:
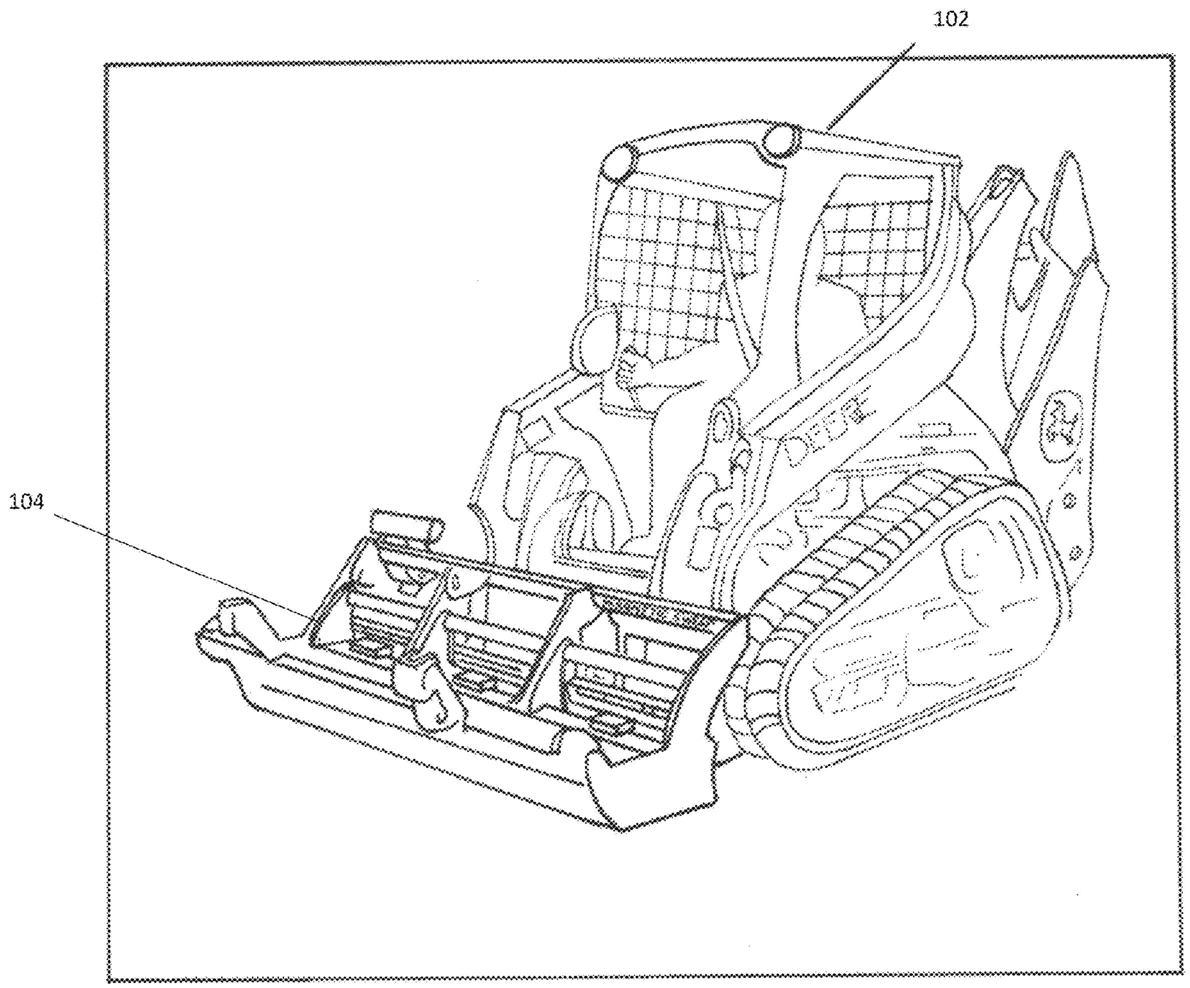
FIG. 1 is a diagram illustrating a skid steer with an exemplary magnetic sweeper.

FIG. 1 is a diagram illustrating a skid steer with an exemplary magnetic sweeper attachment (or magnetic sweeper) is connected to the front to the skid steer. According to FIG. 1, skid steer 102 is shown to have a magnetic sweeper attachment 104 connected to the front.

Figure 2A:
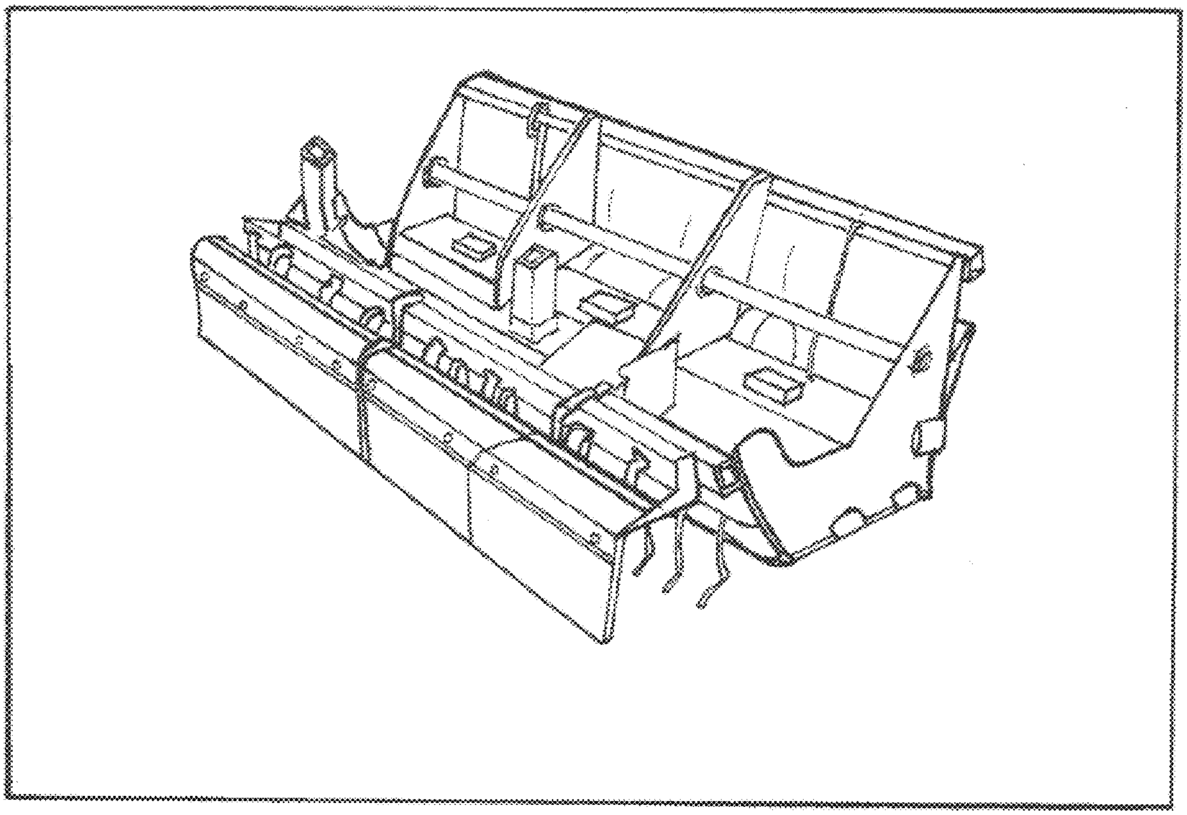
FIGS. 2A to 2D are diagrams that illustrate an exemplary magnetic sweeper in operation.
Figure 2B:
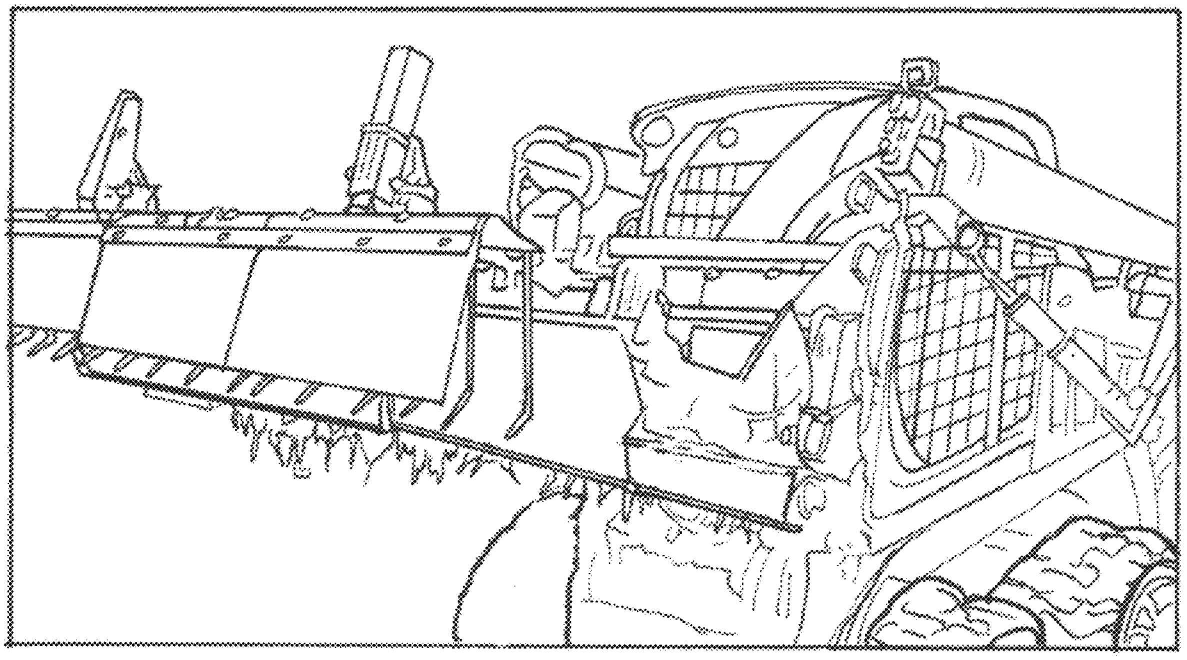
Figure 2C:
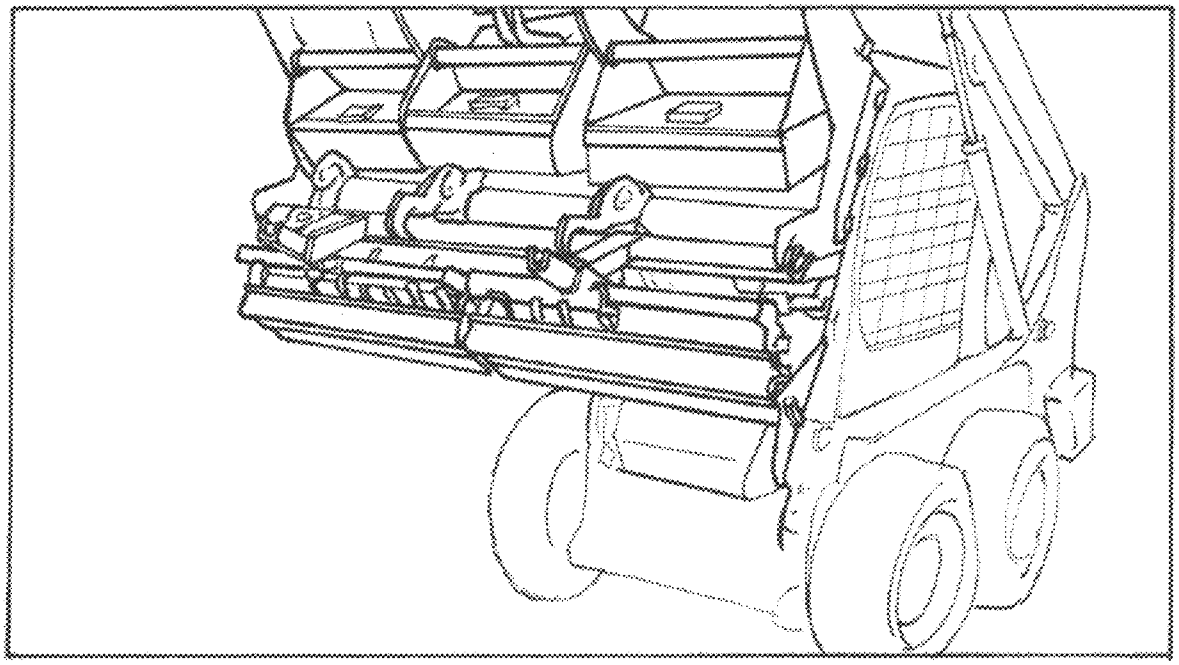
Figure 2D:
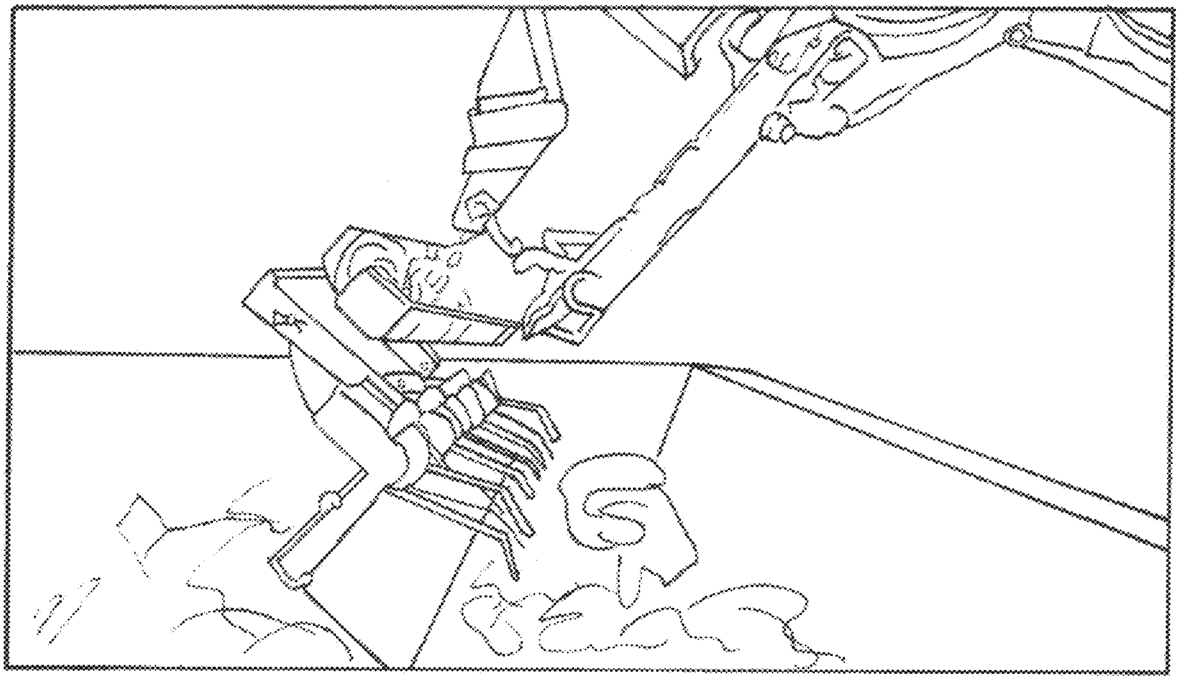

FIGS. 2A to 2D are diagrams that illustrate an exemplary magnetic sweeper in operation. According to the FIGS. 2A to 2D, a magnetic sweeper attached to a skid steer is shown sweeping across some debris (FIG. 2A), picking up the debris (FIG. 2B) and depositing the debris on the ground (FIG. 2C) and depositing the debris in a garbage container (FIG. 2D). According to FIG. 2D, the magnetic sweeper allows the industrial equipment to lift the magnetic sweeper high enough to discharge the metal debris into a scrap or garbage bin or large pile, removing the need for secondary handling of the collected metal debris.

Figure 3:
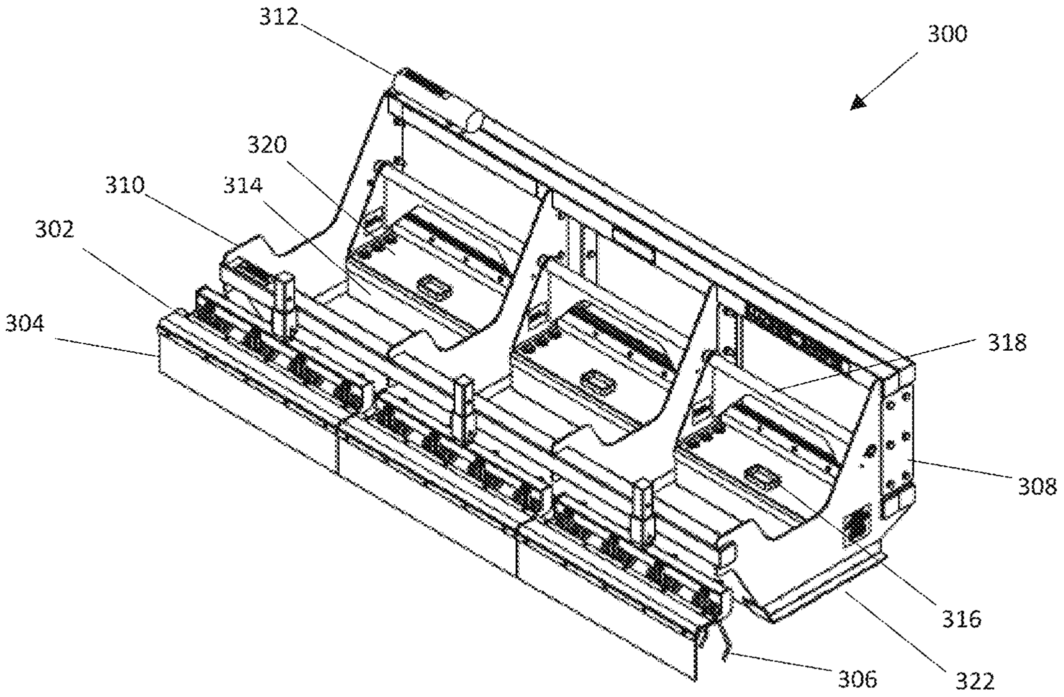
FIG. 3 is a line drawing illustrating a perspective view of an exemplary magnetic sweeper.

FIG. 3 is a line drawing illustrating a perspective view of an exemplary magnetic sweeper. According to FIG. 3, magnetic sweeper attachment 300 consists of debris rake frame 302, debris rake damper (or guard) 304, rake spring or tines 306, mounting bracket connector 308, frame connector 310, document holder 312, magnet assembly 314. The rake spring or tines 306 disturbs the ground and loosens objects in the ground as the skid steer (or motorized vehicle) moves forwards or backwards.

According to FIG. 3, magnet assembly attachment 300 consists of three magnetic assemblies 314 where individual magnets 320 are contained (i.e., magnet 320 is inside magnet assembly 314). The dimensions of magnet assembly 314 are approximately 29" length×9" width×6.25" height that houses a magnet 320 with dimensions of 28" length×8" width×6" height. Magnet 320 can be a Ceramic8 magnet, rare earth magnet or other similar magnets. Magnet assembly 314 also comprises a pivot frame 318 and step 316.

According to FIG. 3, magnet assembly attachment 300 further comprises a magnetic pan 322, which is a flat metal bottom surface where metallic debris attaches to.

Figure 4:
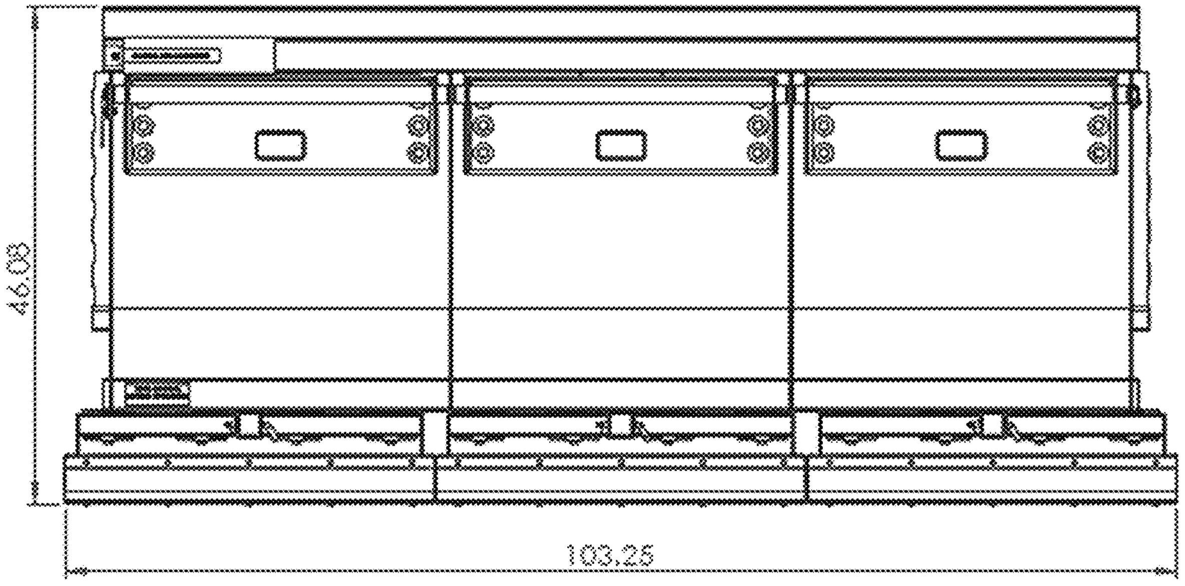
FIG. 4 is a line drawing illustrating a top view of an exemplary magnetic sweeper.
Figure 5:
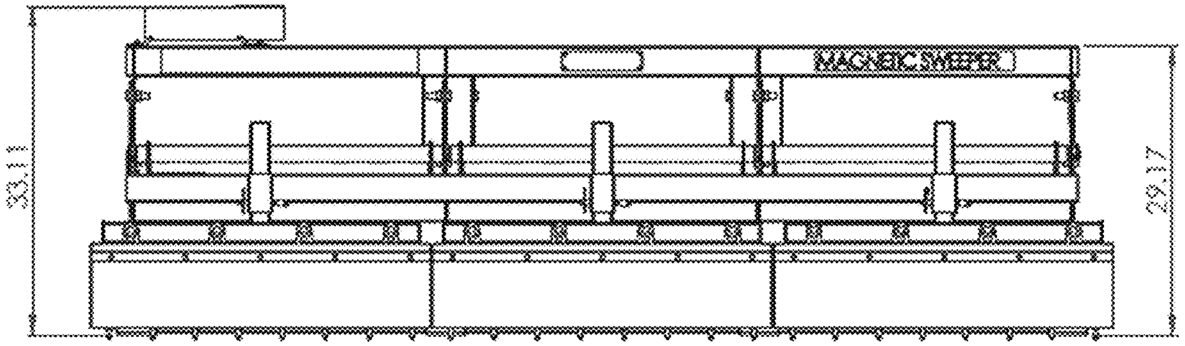
FIG. 5 is a line drawing illustrating a front view of an exemplary magnetic sweeper.
Figure 6:
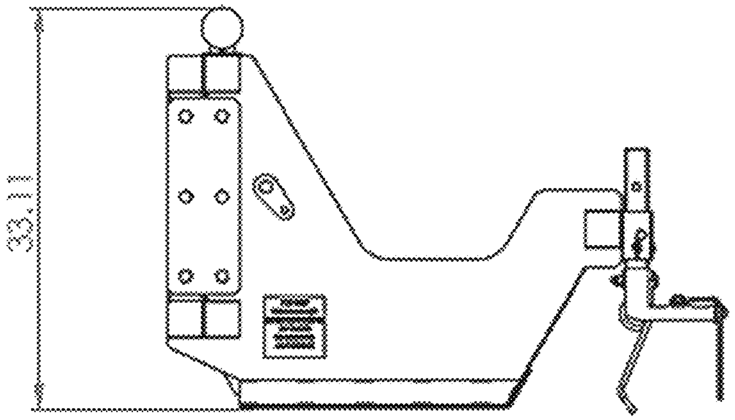
FIG. 6 is a line drawing illustrating a left side view of an exemplary magnetic sweeper.

FIG. 4 is a line drawing illustrating a top view of an exemplary magnetic sweeper (or magnetic sweeper attachment). FIG. 5 is a line drawing illustrating a front view of an exemplary magnetic sweeper. FIG. 6 is a line drawing illustrating a left side view of an exemplary magnetic sweeper. According to FIGS. 3 to 6, an exemplary magnetic sweeper will have three sets of tines 306 and three individual pivoting magnet assemblies 314. Furthermore, the exemplary magnetic sweeper has dimensions of 103.25" width× 46.08" length×33.11" height. According to FIGS. 3 to 6, magnetic sweeper 300 can be made of steel, stainless steel, aluminum, magnets, rubber and plastics. Other materials may be used in other embodiments.

Figure 7:
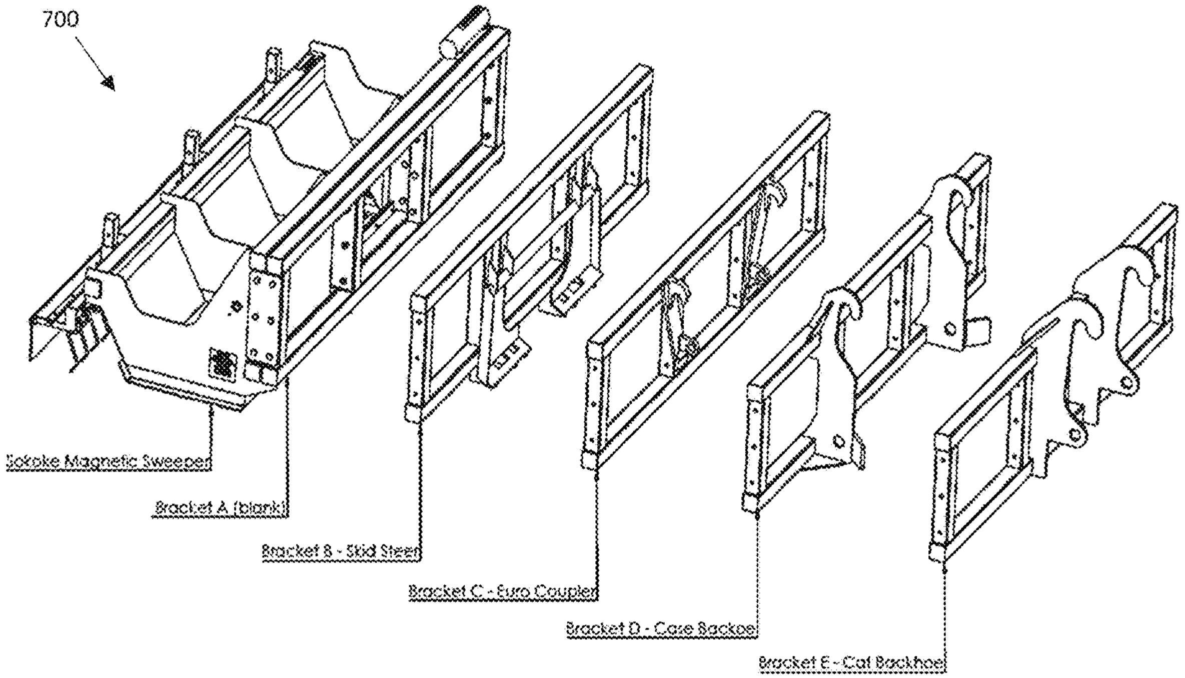
FIG. 7 is a line drawing illustrating a perspective view of an exemplary magnetic sweeper with optional bracket attachments.

FIG. 7 is a line drawing illustrating a perspective view of an exemplary magnetic sweeper with optional bracket attachments. According to FIG. 7, exemplary magnetic sweeper 700 may support different brackets to mount onto different industrial equipment. For example, there may be a generic bracket (Bracket A), skid steer bracket (Bracket B), euro coupler bracket (Bracket C), Case backhoe bracket (Bracket D) and Cat backhoe bracket (Bracket E). Furthermore, other bracket designs can also be developed to attach to the magnetic sweeper and industrial equipment. Different mounts allow this device to attach to any piece of machinery that uses a bucket or forks.

Figure 8:
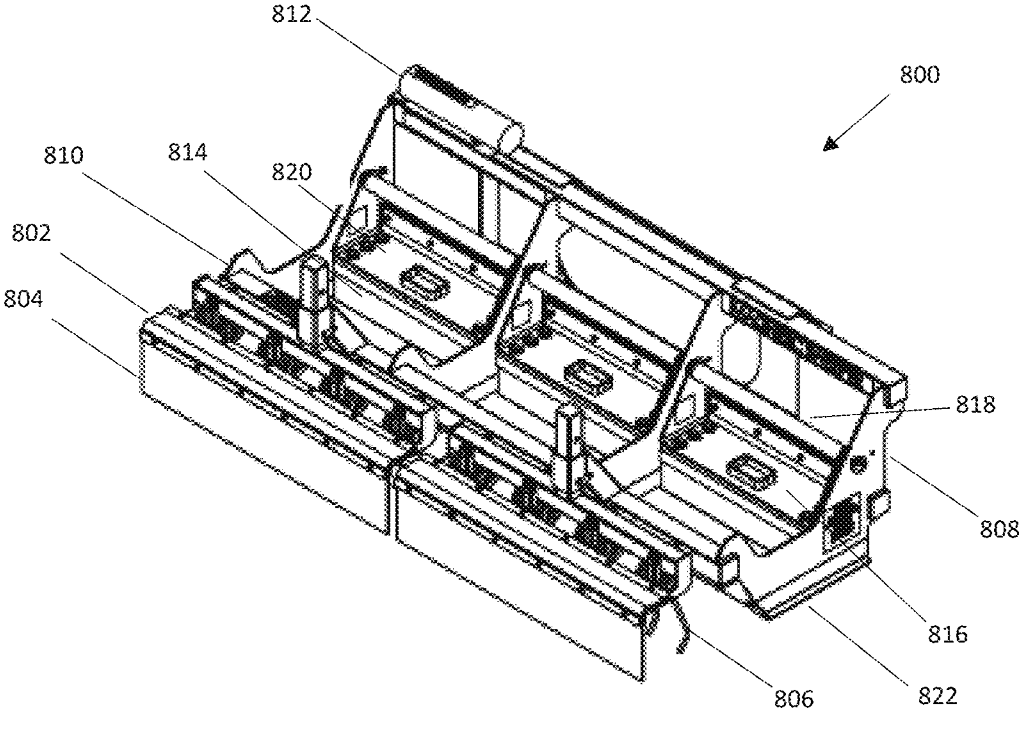
FIG. 8 is a line drawing illustrating a perspective view of an alternate magnetic sweeper.

FIGS. 8 to 12 are diagrams that illustrate an alternate magnetic sweeper. FIG. 8 is a line drawing illustrating a front perspective view of an alternate magnetic sweeper. According to FIG. 8, alternate magnetic sweeper attachment 800 (or alternate magnetic sweeper) consists of debris rake frame 802, debris rake damper (or guard) 804, rake spring or tines 806, mounting bracket connector 808, frame connector 810, document holder 812, and magnet assembly 814. The rake spring or tines 806 disturbs the ground and loosens objects in the ground as the skid steer (or motorized vehicle) moves forwards or backwards.

According to FIG. 8, alternate magnetic sweeper attachment 800 consists of two sets of debris rake frames 802 whereas magnetic sweeper attachment 300 (shown in FIG. 3) has three sets of debris rake frames 302.

According to FIG. 8, magnet assembly attachment 800 further includes three magnetic assemblies 814 where magnet(s) 820 are housed. The dimensions of magnet assembly 814 are approximately 29" length×9" width×6.25" height that houses a magnet 820 with dimensions of 28" length×8" width×6" height. Magnet 820 can be a Ceramic8 magnet or other similar magnets. Magnet assembly 814 also comprises a pivot frame 818 and step 816.

According to FIG. 8, magnet assembly attachment 800 further comprises a magnetic pan 822, which is a flat metal bottom surface to which metallic debris attaches.

Figure 9:
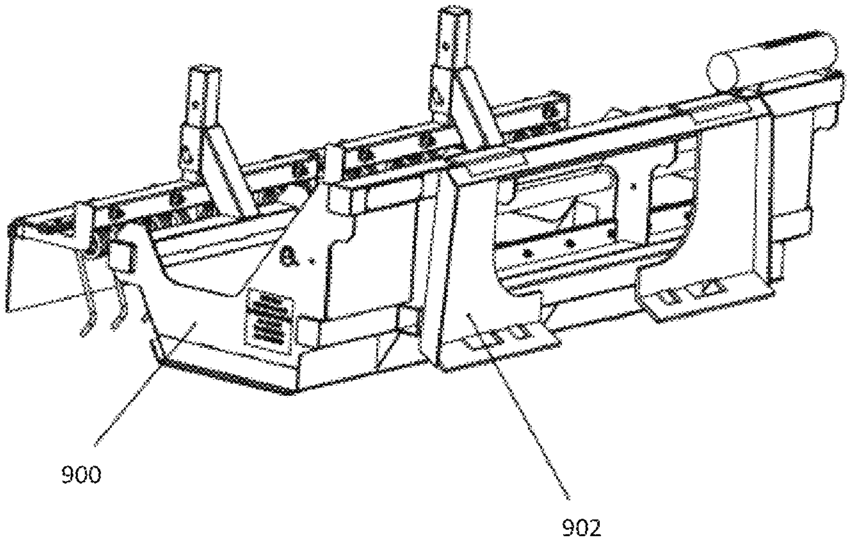
FIG. 9 is a line drawing illustrating a back perspective view of an alternate magnetic sweeper.
Figure 10:
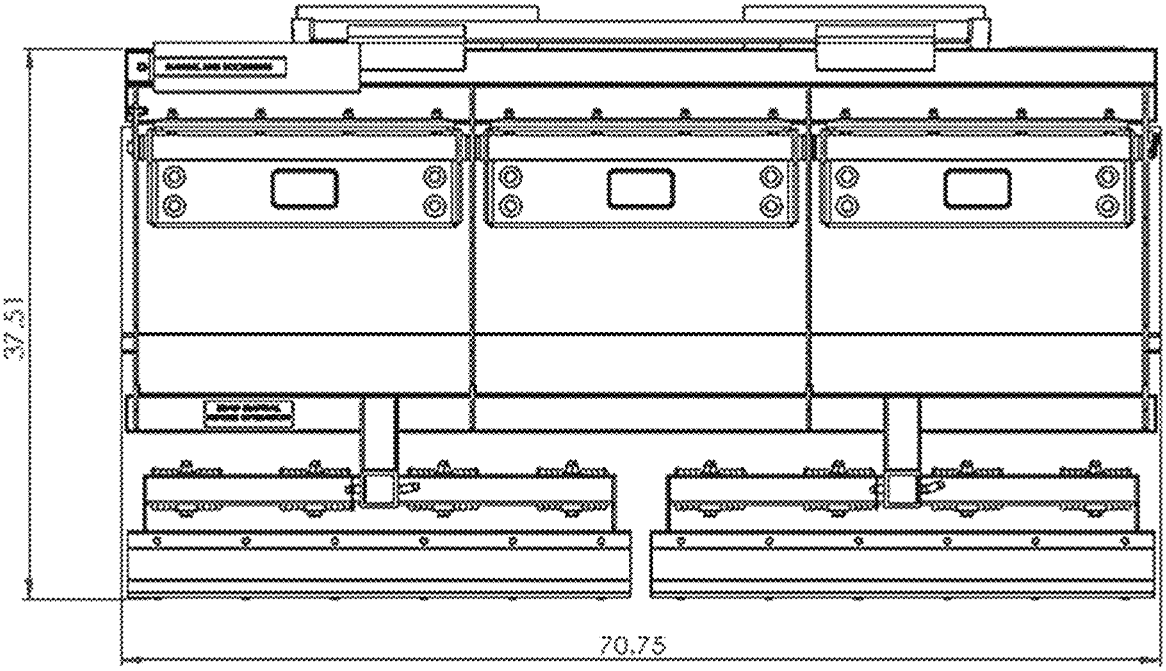
FIG. 10 is a line drawing illustrating a top view of an alternate magnetic sweeper.
Figure 11:
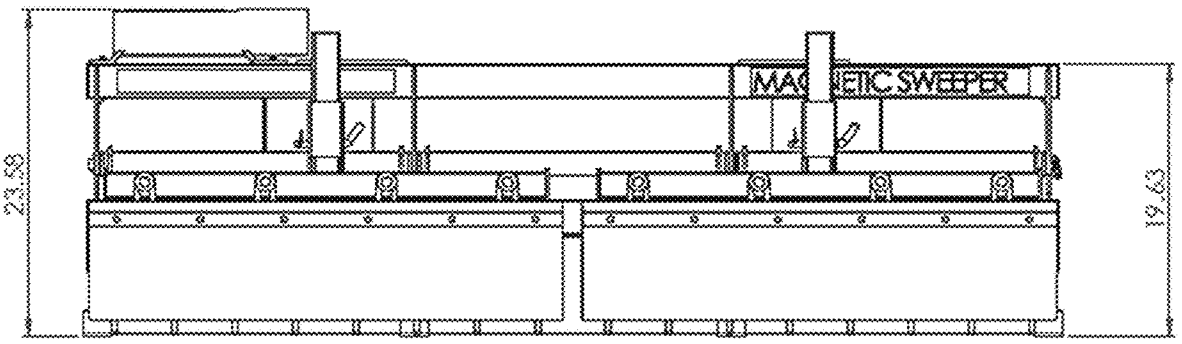
FIG. 11 is a line drawing illustrating a front view of an alternate magnetic sweeper.
Figure 12:
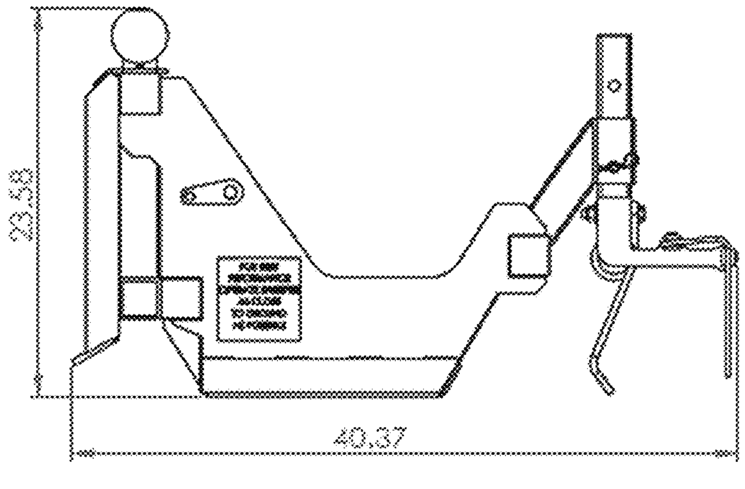
FIG. 12 is a line drawing illustrating a left side view of an alternate magnetic sweeper.

FIG. 9 is a line drawing illustrating a rear perspective view of an alternate magnetic sweeper. According to FIG. 9, alternate magnetic sweeper (or magnetic sweeper attachment) is shown having a universal skid steer attachment connector (or plate) 902. FIG. 10 is a line drawing illustrating a top view of an alternate magnetic sweeper. FIG. 11 is a line drawing illustrating a front view of an alternate magnetic sweeper. FIG. 12 is a line drawing illustrating a left side view of an alternate magnetic sweeper. According to FIGS. 10 to 12, the dimensions of the alternate magnetic sweeper are approximately 70.75" width by 37.51" length by 23.58" height.

According to FIGS. 8 and 9, the alternate magnetic sweeper consists of the two sets of tines, three magnets and a universal skid steer attachment plate. Dimensions for the alternate skid steer design are approximately 70.75" width× 37.51" length×22.58" height.

Operating Instructions

Figure 13:
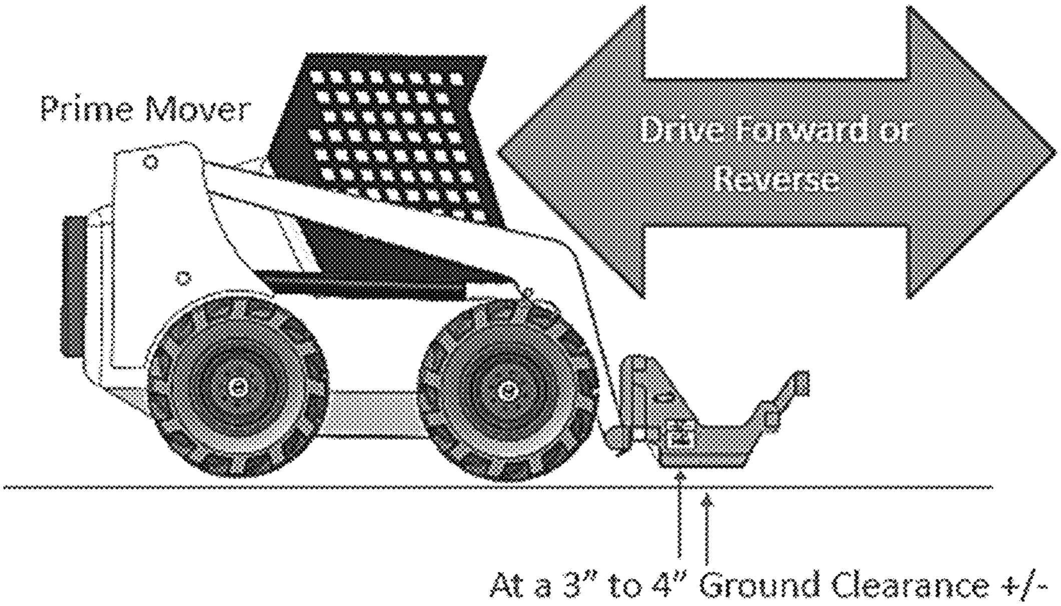
FIG. 13 is a diagram illustrating Step 1 of operating the magnetic sweeper.
Figure 14:
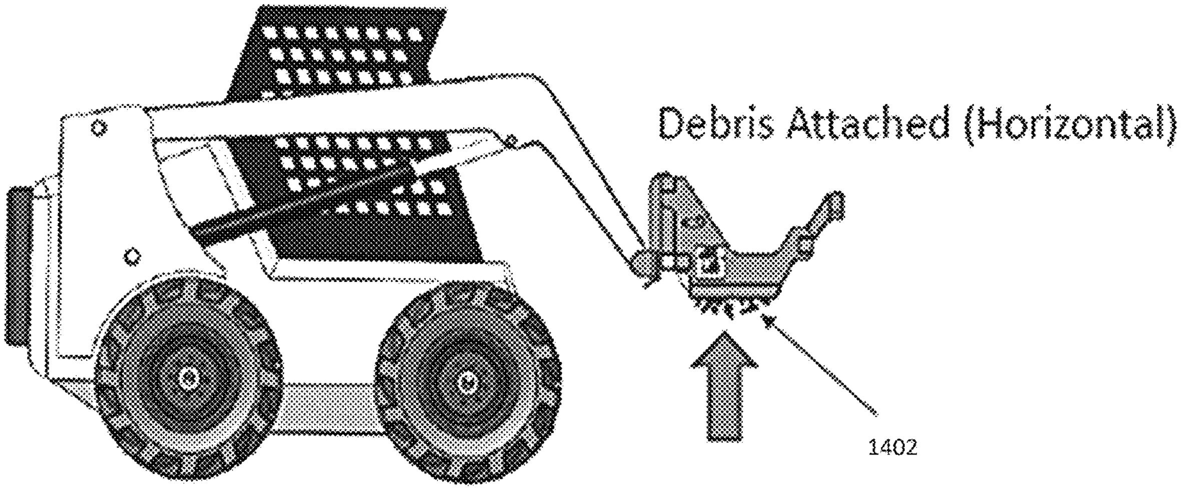
FIG. 14 is a diagram illustrating Step 2 of operating the magnetic sweeper.
Figure 15:
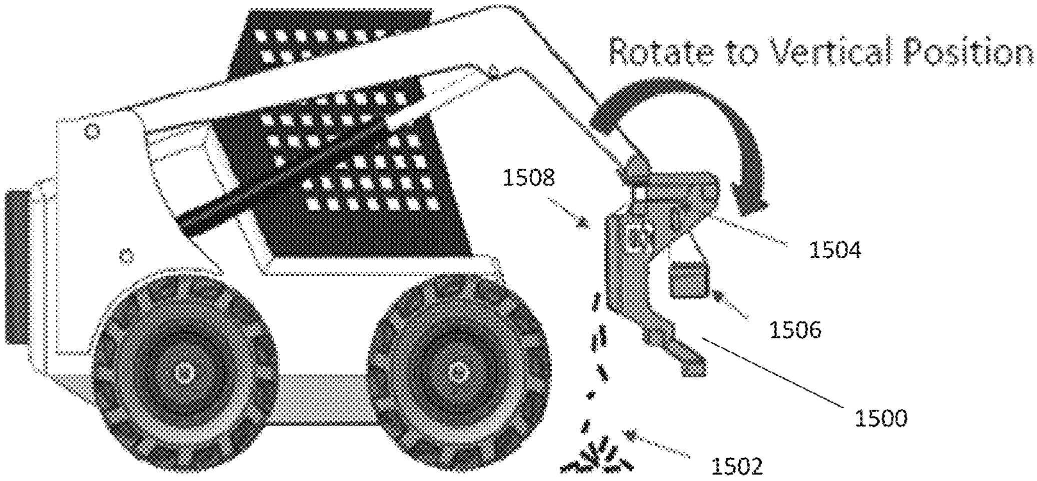
FIG. 15 is a diagram illustrating Step 3 of operating the magnetic sweeper.

FIGS. 13 to 15 are diagrams illustrating the operating steps of operating the magnetic sweeper. FIG. 13 is a diagram illustrating Step 1 of operating the magnetic sweeper. Step 1 involves picking up metal debris. When operating the magnetic sweeper, it should be as low to the ground as possible (for best performance) but not contacting it. The bottom of the sweeper should be level (or close to) when operating and provide approximately 3" to 4" of ground clearance. According to FIG. 13, debris sticks to the bottom of the pan by magnetic forces.

FIG. 14 is a diagram illustrating Step 2 of operating the magnetic sweeper. Step 2 involves lifting the magnetic sweeper off the ground using the vehicle or industrial equipment. Metal debris 1402 under the magnetic sweeper will be picked up and attached to the bottom pan based on magnet forces.

FIG. 15 is a diagram illustrating Step 3 of operating the magnetic sweeper. Step 3 involves cleaning off the collected metal debris. Once the magnetic sweeper 1500 is elevated, the magnet pivot 1504 allows the pan 1508 to move into the shown vertical position and the collected metal debris 1502 will fall off the bottom of the pan 1508. Once the magnet is cleaned off, the magnetic sweeper 1500 is positioned back to a horizontal position where the lift arms are lowered and the magnetic sweeper 1500 can continue sweeping.

According to FIG. 15, the entire chassis of magnetic sweeper 1500 rotates 90 degrees from working condition. The magnet 1506 stays relatively in same sweep position because of gravity. When magnet 1506 moves away, the magnetic force is further away, thus debris 1502 falls off (i.e,. weaker magnetic force).

Figure 16:
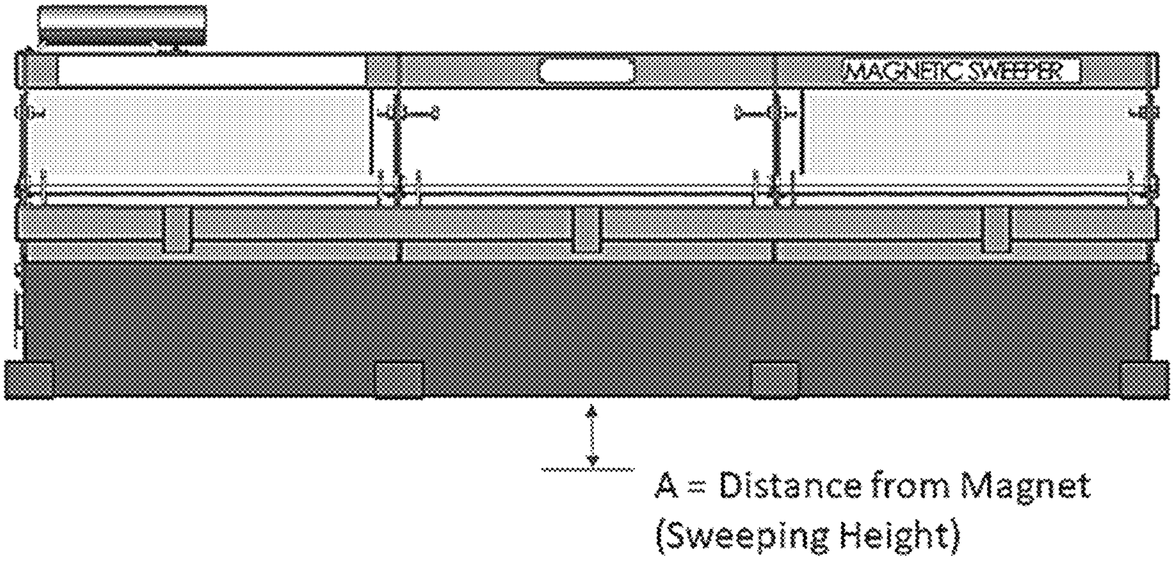
FIG. 16 is a diagram that illustrates the Gauss (G) measurements for the magnetic strength of the magnetic sweeper.

FIG. 16 is a diagram that illustrates the Gauss (G) measurements for the magnetic strength of the magnetic sweeper. According to FIG. 16, sweeping height A is the distance from the magnet. The following table (also shown in FIG. 16) illustrates the relationship between sweeping height and magnet strength (in Guass):

| Distance A | 3" | 4" | 5" | 6" | 7" |
|---|---|---|---|---|---|
| Gauss (G) | 532 | 428 | 380 | 316 | 270 |

According to FIG. 16, the closer the sweeping height (Distance A), the stronger the magnetic force and the larger the sweeping height, the smaller the magnetic strength. For example, at 3", the magnetic strength is 532 G and at 7", the magnetic strength is 270 G.

According to the disclosure, the magnetic sweeper has a sectional magnet design that allows the steel frame to extend between the magnets which creates a very strong product that can withstand the abuse of being on the front of the industrial equipment (e.g., Prime Mover) near the ground. In some applications it may be beneficial to utilize a single magnet rather than the sectional design.

According to the disclosure, a different size or grade of the magnet assembly can be incorporated. Furthermore, the magnetic sweeper can support either permanent magnets or electromagnetic magnets.

According to the disclosure, an optional debris digging rake can be added as an accessory to the magnetic sweeper to disturb the ground surface to loosen it and allow the magnetic sweeper to pick up debris in the top surface.

According to the disclosure, the magnetic sweeper is designed for a single user to operate and clean it off without help from others. Furthermore, the magnetic sweeper requires no auxiliary power source (e.g., hydraulic, mechanical, or electrical) or a person to clean the debris off the magnet.

According to the disclosure, the magnetic sweeper can be made from steel, stainless steel, aluminum, magnets, rubber and plastics. In other embodiments, other materials may be used.

According to the disclosure, the magnetic sweeper connects to industrial equipment using a universal skid steer attachment plate that enables connection to smaller equipment such as skid steers, tractors, and small loaders.

According to the disclosure, further embodiments of the magnetic sweeper are designed to connect to equipment using a removable bracket that can be modified or designed to fit nearly any loader bucket connection style including skid steer styles and Euro connector styles. Brackets that have been developed now include:

A) Blank (This bracket option allows the customer to weld or bolt on other parts to the blank bracket for connection to their equipment)
B) Universal Skid Steer Attachment Plate
C) Euro Connector (also known as Alo/Quicke/Global)
D) Case 570MXT Series 3 Backhoe Connector
E) Caterpillar 440 Backhoe Connector
F) JRB 416 Connector According to the disclosure, an alternative embodiment for magnetic debris collection involves having the magnet in a fixed position, and the debris pan on bottom with some type of extended arm on it. This allows the arm to be pressed into the ground by the industrial equipment (Prime Movers) movements, and a spring to return the debris pan back into position for sweeping and collecting more debris.

According to the disclosure Prime Movers is a brand of industrial equipment. It is also a general term for industrial equipment to which an accessory is attached and from which the accessory is powered or controlled.

According to the disclosure, a magnetic sweeper apparatus configured for attachment to an industrial vehicle for magnetic sweeping of metallic debris is disclosed. The magnetic sweeper apparatus comprises a frame, an attachment bracket configured for attachment of the frame to the industrial vehicle, a metallic bottom pan of the frame for magnetic attachment of debris, a debris rake frame assembly and a magnet assembly.

According to the disclosure, the debris rake frame assembly of the magnetic sweeper apparatus further comprises a debris rake frame, a debris rake damper or guard and a plurality of springs or tines. The magnet assembly of the magnetic sweeper apparatus further comprises a magnet assembly housing, a magnet and a pivot frame.

According to the disclosure, the debris rake frame assembly is configured to disturb the ground and loosen objects in the ground as the industrial vehicle moves forwards or backwards and the magnet pivots on the pivot frame as the magnetic sweeper apparatus is moved from a vertical to horizontal position and metallic debris is collected at the pan.

According to the disclosure, as the magnetic sweeper apparatus is pivoted downward, the mass of the magnets, which is greater than its attraction force to the metal debris attaches to the pan, and as the magnetic sweeper apparatus is pivoted upwards, it allows the magnet to hang vertically and the pan is forced away from the magnet whereby the metal debris moves away from the magnetic field of the magnet and falls off the magnetic sweeper.

According to the disclosure, the attachment bracket of the magnetic sweeper apparatus is configured to connect to an industrial vehicle selected from a list consisting of a skid steer, a vehicle enabled with a euro coupler, a Case backhoe and a Caterpillar backhoe. The magnetic sweeper apparatus further comprises a cylindrical document holder and the magnet assembly has a step.

According to the disclosure, the magnetic sweeper apparatus further comprising a single, two, three or more debris rake frame assembly. The magnetic sweeper apparatus is configured to house two or more magnet assemblies. The magnetic sweeper apparatus further comprising a frame connector that connects the debris rake frame assembly to the frame of the apparatus.

According to the disclosure, the dimensions of the magnet assembly are 29" length by 9" width by 6.25" height that houses the magnet with dimensions of 28" length by 8" width by 6" height. The dimensions of the magnetic sweeper apparatus are 103.25" width by 46.08" length by 33.11" height.

According to the disclosure, the magnet of the magnetic sweeper apparatus is a Ceramic 8 or rare earth magnet. The material of the magnetic sweeper apparatus is selected from a list consisting of steel, stainless steel, aluminum, magnets, rubber and plastics.

According to the disclosure, the magnetic sweeper apparatus is configured to attach to the industrial vehicle without the use of hydraulics support.

According to the disclosure, a method of removing metallic debris, using a magnetic sweeper attachment on an industrial vehicle is disclosed. The method comprising the steps of placing the magnetic sweeper attachment in horizontal position, the magnetic sweeper attachment further comprising a bottom metallic pan surface and a magnet assembly, the magnet assembly further comprising a magnet and a magnet pivot, driving the industrial vehicle forward or backwards, attracting metal debris at the bottom of the magnetic sweeper attachment; lifting the magnetic sweeper attachment and rotating the matching sweeper attachment to a vertical position.

According to the disclosure, in a vertical position, the magnet rotates around the magnet pivot and is positioned further away from the metallic pan thereby creating a weaker magnetic force, allowing gravity to clean off the metallic debris to the ground.

According to the disclosure, the magnetic sweeper attachment has ground clearance of 3" to 4". The magnetic sweeper attachment is configured to house two or more magnet assemblies.

According to the disclosure, the dimensions of the magnet assembly are 29" length by 9" width by 6.25" height that houses a magnet with dimensions of 28" length by 8" width by 6" height. The dimensions of the magnetic sweeper attachment are 103.25" width by 46.08" length by 33.11" height.

According to the disclosure, the magnet of the magnetic sweeper attachment is a Ceramic 8 magnet or a rare earth magnet. The material of magnetic sweeper attachment is selected from a list consisting of steel, stainless steel, aluminum, magnets, rubber and plastics.

According to the disclosure, the aforementioned method is configured to attach to the industrial vehicle without the use of hydraulics support.

While some embodiments or aspects of the present disclosure may be implemented in fully functioning mechanical, electrical and electrical-mechanical systems, other embodiments may be considered.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The specific embodiments described above have been shown by way of example and understood is that these embodiments may be susceptible to various modifications and alternative forms. Further understood is that the claims are not intended to be limited to the forms disclosed, but rather to cover all modifications, equivalents, and alternatives falling within the spirit and scope of this disclosure. While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above-described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become obvious to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, various changes and modifications in form, material, workpiece, and fabrication material detail may be made, without departing from the spirit and scope of the present disclosure, as set forth in the appended claims, as may be apparent to those of ordinary skill in the art, are also encompassed by the present disclosure.

What is claimed is:

1. A magnetic sweeper apparatus, configured for attachment to the front of an industrial vehicle for magnetic sweeping of metallic debris, the apparatus comprising:
- a frame;
- an attachment bracket configured for attachment of the frame to a lifting arm at the front of the industrial vehicle;
- a metallic bottom pan of the frame for magnetic attachment of debris;
- a debris rake frame assembly further comprising:
  - a debris rake frame;
  - a debris rake damper or guard;
  - a plurality of springs or tines;
- a magnet assembly further comprising:
  - a magnet assembly housing;
  - a magnet;
  - a pivot frame;
- a frame connector configured to connect the debris rake frame assembly to the frame of the apparatus;
- wherein the debris rake frame assembly is configured to disturb the ground and loosen objects in the ground as the industrial vehicle moves forwards or backwards;
- wherein the magnet pivots on the pivot frame as the magnetic sweeper apparatus is moved from a vertical position to a horizontal position and metallic debris is collected at the pan;
- wherein the magnetic sweeper apparatus is configured to operate in a sweeping configuration in the horizontal position and a dumping configuration in the vertical position;
- wherein as the magnetic sweeper apparatus is pivoted downward, the mass of the magnet, which is greater than its attraction force to the metal debris attached to the pan, allows the magnet to hang vertically and the pan is forced away from the magnet whereby the metal debris moves away from the magnetic field of the magnet and falls off the magnetic sweeper in the dumping configuration.

2. The apparatus of claim 1 wherein the attachment bracket is configured to connect to the front of the industrial vehicle selected from a list consisting of a skid steer, a euro coupler-enabled vehicle, a compact track loader and a backhoe.

3. The apparatus of claim 1 further comprising a cylindrical document holder and wherein the magnet assembly has a step.

4. The apparatus of claim 1 wherein the apparatus further comprising a single, two, three or more debris rake frame assembly.

5. The apparatus of claim 1 wherein the apparatus is configured to house two or more magnet assemblies.

6. The apparatus of claim 1 wherein the dimensions of magnet assembly are 29" length by 9" width by 6.25" height that houses the magnet with dimensions of 28" length by 8" width by 6" height.

7. The apparatus of claim 1 wherein the dimensions of the apparatus are 103.25" width by 46.08" length by 33.11" height.

8. The apparatus of claim 1 wherein the magnet is a Ceramic 8 or rare earth magnet.

9. The apparatus of claim 1 wherein the material of apparatus is selected from a list consisting of steel, stainless steel, aluminum, magnets, rubber and plastics.

10. The apparatus of claim 1 wherein the apparatus is configured to attach to the industrial vehicle without requiring a connection to the hydraulic system of the vehicle.

* * * * *